United States Patent
Barry et al.

(10) Patent No.: US 8,799,072 B2
(45) Date of Patent: *Aug. 5, 2014

(54) METHOD AND SYSTEM FOR PROVIDING FILTERED AND/OR MASKED ADVERTISEMENTS OVER THE INTERNET

(75) Inventors: Christopher J. Barry, Somers, NY (US); Eric Robert Bronnimann, Astoria, NY (US); Jacob Paul Ewerdt, Lakewood, CO (US); William C. Day, Haworth, NJ (US); Kevin R J B Donovan, White Plains, NY (US); Brian Hammond, New York, NY (US); Ron McCoy, Doraville, GA (US); Sara Frances Plath, New York, NY (US); Dan C. Porter, Brooklyn, NY (US); James Keith Toothman, Ringwood, NJ (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/244,137

(22) Filed: Sep. 23, 2011

(65) Prior Publication Data

US 2012/0016744 A1 Jan. 19, 2012

Related U.S. Application Data

(63) Continuation of application No. 10/388,166, filed on Mar. 14, 2003, now Pat. No. 8,050,970.

(60) Provisional application No. 60/398,101, filed on Jul. 25, 2002.

(51) Int. Cl.
*G06Q 30/02* (2012.01)

(52) U.S. Cl.
CPC ..................................... *G06Q 30/02* (2013.01)
USPC ..................................................... 705/14.49

(58) Field of Classification Search
CPC .............. G06Q 30/02; G06Q 30/0251; G06Q 30/0269; G06Q 30/0277
USPC ....................................... 705/14.49; 707/709
See application file for complete search history.

(56) References Cited

U.S. PATENT DOCUMENTS

| 4,982,346 A | 1/1991 | Girouard et al. |
| 5,636,346 A | 6/1997 | Saxe |

(Continued)

FOREIGN PATENT DOCUMENTS

| EP | 1026610 | 8/2000 |
| JP | 2002-133261 | 5/2002 |

(Continued)

OTHER PUBLICATIONS

CanadianApp2493612DialogSrch25sep2012; Dialog search for Canadian application 2493612, which includes the current.*

(Continued)

*Primary Examiner* — John G Weiss
*Assistant Examiner* — Adam Chornesky
(74) *Attorney, Agent, or Firm* — Fish & Richardson P.C.

(57) ABSTRACT

Methods and systems that allow an Internet distribution partner of an advertisement listings provider to receive filtered and masked listings for display on the website of the Internet distribution partner. The Internet distribution partner defines filters to be applied to ranked advertising listings provided by an advertising listing provider. The advertisement listings provider system applies the filter to the listings in its database and identify matches and/or excludes matches depending on the characteristic specified. The advertisement listings provider may then send the Internet distribution partner advertisement listings based on the application of one or more filter selected by the distribution partner. Thus, the advertisement listings provider and the Internet distribution partner are able to generate additional revenue without risking the Internet distribution partner's valuable relationships with its exclusive advertisers and without jeopardizing the Internet advertising distribution partner's relationships with its end users.

42 Claims, 5 Drawing Sheets

(56) References Cited

U.S. PATENT DOCUMENTS

| | | | |
|---|---|---|---|
| 5,649,114 A | 7/1997 | Deaton et al. | |
| 5,724,521 A | 3/1998 | Dedrick | |
| 5,740,549 A | 4/1998 | Reilly et al. | |
| 5,845,265 A | 12/1998 | Woolston | |
| 5,848,396 A | 12/1998 | Gerace | |
| 5,848,397 A | 12/1998 | Marsh et al. | |
| 5,913,030 A | 6/1999 | Lotspiech et al. | |
| 5,918,010 A | 6/1999 | Appleman et al. | |
| 5,918,014 A | 6/1999 | Robinson | |
| 5,920,854 A | 7/1999 | Kirsch et al. | |
| 5,931,901 A | 8/1999 | Wolfe et al. | |
| 5,933,811 A | 8/1999 | Angles et al. | |
| 5,943,653 A | 8/1999 | Ross et al. | |
| 5,948,061 A * | 9/1999 | Merriman et al. | 709/219 |
| 5,974,398 A | 10/1999 | Hanson et al. | |
| 6,026,368 A | 2/2000 | Brown et al. | |
| 6,029,195 A | 2/2000 | Herz | |
| 6,044,375 A | 3/2000 | Shmueli et al. | |
| 6,044,376 A | 3/2000 | Kurtzman, II | |
| 6,061,659 A | 5/2000 | Murray | |
| 6,067,570 A | 5/2000 | Kreynin et al. | |
| 6,078,866 A | 6/2000 | Buck et al. | |
| 6,078,914 A | 6/2000 | Redfern | |
| 6,078,924 A | 6/2000 | Ainsbury et al. | |
| 6,112,181 A | 8/2000 | Shear et al. | |
| 6,119,125 A | 9/2000 | Gloudeman et al. | |
| 6,144,944 A | 11/2000 | Kurtzman, II et al. | |
| 6,144,988 A | 11/2000 | Kappel | |
| 6,167,382 A | 12/2000 | Sparks et al. | |
| 6,199,034 B1 | 3/2001 | Wical | |
| 6,223,163 B1 | 4/2001 | Van Luchene | |
| 6,247,009 B1 | 6/2001 | Shilyama et al. | |
| 6,251,017 B1 | 6/2001 | Leason et al. | |
| 6,253,189 B1 | 6/2001 | Feezell et al. | |
| 6,269,361 B1 | 7/2001 | Davis et al. | |
| 6,285,987 B1 | 9/2001 | Roth et al. | |
| 6,298,348 B1 | 10/2001 | Eldering | |
| 6,311,185 B1 | 10/2001 | Markowitz et al. | |
| 6,324,519 B1 | 11/2001 | Eldering | |
| 6,336,132 B2 | 1/2002 | Appleman et al. | |
| 6,401,075 B1 | 6/2002 | Mason et al. | |
| 6,421,675 B1 | 7/2002 | Ryan et al. | |
| 6,446,045 B1 | 9/2002 | Stone et al. | |
| 6,615,266 B1 * | 9/2003 | Hoffman et al. | 709/227 |
| 6,701,350 B1 * | 3/2004 | Mitchell | 709/217 |
| 6,804,659 B1 | 10/2004 | Graham et al. | |
| 6,829,587 B2 | 12/2004 | Stone et al. | |
| 6,868,525 B1 | 3/2005 | Szabo | |
| 6,876,974 B1 | 4/2005 | Marsh et al. | |
| 6,954,728 B1 * | 10/2005 | Kusumoto et al. | 705/14.4 |
| 6,985,882 B1 | 1/2006 | Del Sesto | |
| 7,007,074 B2 | 2/2006 | Radwin | |
| 7,039,599 B2 | 5/2006 | Merriman | |
| 7,047,033 B2 | 5/2006 | Wyler | |
| 7,103,643 B1 | 9/2006 | Jacobs et al. | |
| 7,117,504 B2 | 10/2006 | Smith et al. | |
| 7,136,875 B2 | 11/2006 | Anderson et al. | |
| 7,188,085 B2 | 3/2007 | Pelletier | |
| 7,240,025 B2 | 7/2007 | Stone et al. | |
| 7,249,059 B2 | 7/2007 | Stone et al. | |
| 7,263,558 B1 | 8/2007 | Khirman et al. | |
| 7,284,039 B2 | 10/2007 | Berkland et al. | |
| 7,328,231 B2 | 2/2008 | LaCroix et al. | |
| 7,389,251 B1 | 6/2008 | Woolston et al. | |
| 7,490,056 B2 | 2/2009 | Nash | |
| 7,499,878 B2 | 3/2009 | Janakiraman et al. | |
| 7,523,191 B1 | 4/2009 | Thomas et al. | |
| 7,630,986 B1 * | 12/2009 | Herz et al. | 1/1 |
| 7,660,737 B1 | 2/2010 | Lim et al. | |
| 7,685,224 B2 | 3/2010 | Nye | |
| 7,711,599 B1 | 5/2010 | Libman | |
| 7,761,330 B2 * | 7/2010 | Yoshimine et al. | 705/14.61 |
| 8,386,315 B1 * | 2/2013 | Bala et al. | 705/14.43 |
| 2001/0042064 A1 | 11/2001 | Davis et al. | |
| 2001/0047297 A1 | 11/2001 | Wen | |
| 2001/0051911 A1 | 12/2001 | Marks et al. | |
| 2002/0002525 A1 | 1/2002 | Arai et al. | |
| 2002/0010679 A1 | 1/2002 | Felsher | |
| 2002/0010757 A1 | 1/2002 | Granik et al. | |
| 2002/0016735 A1 | 2/2002 | Runge et al. | |
| 2002/0035536 A1 | 3/2002 | Gellman | |
| 2002/0038247 A1 | 3/2002 | Kambayashi et al. | |
| 2002/0038282 A1 | 3/2002 | Montgomery | |
| 2002/0046104 A1 | 4/2002 | Kaddeche et al. | |
| 2002/0069105 A1 | 6/2002 | do Rosario Botelho et al. | |
| 2002/0077891 A1 | 6/2002 | Castle et al. | |
| 2002/0087315 A1 * | 7/2002 | Lee et al. | 704/256 |
| 2002/0087316 A1 * | 7/2002 | Lee et al. | 704/257 |
| 2002/0087320 A1 * | 7/2002 | Lee et al. | 704/270 |
| 2002/0087325 A1 * | 7/2002 | Lee et al. | 704/270.1 |
| 2002/0087580 A1 | 7/2002 | LaCroix et al. | |
| 2002/0099605 A1 | 7/2002 | Weitzman et al. | |
| 2002/0111898 A1 | 8/2002 | Numaoka et al. | |
| 2002/0120462 A1 * | 8/2002 | Good | 705/1 |
| 2002/0123988 A1 | 9/2002 | Dean et al. | |
| 2003/0014312 A1 | 1/2003 | Fleisher | |
| 2003/0014448 A1 | 1/2003 | Castellanos et al. | |
| 2003/0018966 A1 | 1/2003 | Cook et al. | |
| 2003/0028428 A1 | 2/2003 | Plow et al. | |
| 2003/0046407 A1 * | 3/2003 | Erickson et al. | 709/229 |
| 2003/0050831 A1 | 3/2003 | Klayh | |
| 2003/0050863 A1 * | 3/2003 | Radwin | 705/27 |
| 2003/0051055 A1 * | 3/2003 | Parrella et al. | 709/246 |
| 2003/0090510 A1 * | 5/2003 | Shuping et al. | 345/738 |
| 2003/0093792 A1 | 5/2003 | Labeeb et al. | |
| 2003/0139966 A1 | 7/2003 | Sirota et al. | |
| 2003/0149618 A1 | 8/2003 | Sender et al. | |
| 2003/0191816 A1 | 10/2003 | Landress et al. | |
| 2004/0001498 A1 * | 1/2004 | Chen et al. | 370/401 |
| 2004/0008697 A1 | 1/2004 | Millard et al. | |
| 2004/0015397 A1 | 1/2004 | Barry et al. | |
| 2004/0019523 A1 * | 1/2004 | Barry et al. | 705/14 |
| 2004/0024640 A1 * | 2/2004 | Engle et al. | 705/14 |
| 2004/0044571 A1 | 3/2004 | Bronniman et al. | |
| 2004/0059708 A1 | 3/2004 | Dean et al. | |
| 2004/0059712 A1 | 3/2004 | Dean et al. | |
| 2004/0093327 A1 | 5/2004 | Anderson et al. | |
| 2004/0119740 A1 | 6/2004 | Chang et al. | |
| 2004/0167928 A1 | 8/2004 | Anderson et al. | |
| 2004/0193722 A1 | 9/2004 | Donovan | |
| 2004/0193921 A1 * | 9/2004 | Byrne | 713/201 |
| 2004/0249709 A1 | 12/2004 | Donovan et al. | |
| 2005/0027810 A1 | 2/2005 | Donovan | |
| 2005/0044008 A1 * | 2/2005 | Freishtat et al. | 705/26 |
| 2005/0044157 A1 | 2/2005 | Bartholomew | |
| 2005/0065806 A1 | 3/2005 | Harik | |
| 2005/0071224 A1 | 3/2005 | Fikes et al. | |
| 2005/0096979 A1 | 5/2005 | Koningstein | |
| 2005/0114443 A1 | 5/2005 | Donovan | |
| 2005/0131758 A1 | 6/2005 | Desikan et al. | |
| 2005/0131762 A1 | 6/2005 | Bharat et al. | |
| 2005/0144069 A1 | 6/2005 | Wiseman et al. | |
| 2005/0216335 A1 | 9/2005 | Fikes et al. | |
| 2005/0222900 A1 | 10/2005 | Fuloria et al. | |
| 2005/0222903 A1 | 10/2005 | Buchheit et al. | |
| 2005/0222989 A1 | 10/2005 | Haveliwala et al. | |
| 2005/0223002 A1 | 10/2005 | Agarwal et al. | |
| 2005/0273514 A1 | 12/2005 | Milkey et al. | |
| 2006/0075019 A1 | 4/2006 | Donovan et al. | |
| 2006/0167986 A1 | 7/2006 | Tryzna et al. | |
| 2009/0055200 A1 | 2/2009 | Thampy et al. | |
| 2012/0016744 A1 * | 1/2012 | Barry et al. | 705/14.49 |

FOREIGN PATENT DOCUMENTS

| | | | |
|---|---|---|---|
| JP | 2002-175333 | 6/2002 | |
| KR | 1020010001533 | 11/2001 | |
| KR | 2002-0060440 | 7/2002 | |
| WO | WO 97/21183 | 6/1997 | |
| WO | WO 9721183 A1 * | 6/1997 | G06F 151/00 |
| WO | WO99/66719 | 12/1999 | |
| WO | WO00/38074 | 6/2000 | |
| WO | WO01/04784 | 1/2001 | |
| WO | WO01/75665 | 10/2001 | |

(56) References Cited

FOREIGN PATENT DOCUMENTS

| WO | WO01/90947 | 11/2001 |
|---|---|---|
| WO | WO02/054302 | 7/2002 |
| WO | WO2004/042525 | 5/2004 |

OTHER PUBLICATIONS

AdBusDialogSrch20aug2012; Dialog search for advertising using negative filtering; Aug. 20, 2012.*
Official Action dated Dec. 6, 2011 from related Japanese Patent Application No. 2004-524720, 10 pages.
Fuyuhiko Ikeda, "Internet Security Barrier," Mac Power, ASCII Corporation, vol. 12, No. 6, Jun. 1, 2001, pp. 146-147.
Official Action dated Mar. 1, 2012 from related Canadian Patent Application No. 2,493,612, 4 pages.
"A Complete Guide to AdForce", Adforce User Guide, version 2.6, 1998, Chapters 1-9, 329 pages.
AdForce, Inc., S-1/A SEC Filing, May 6, 1999.
AdKnowledge Campaign Manager, Reviewer's Guide, AdKnowledge, Aug. 1998.
AdKnowledge Market Match Planner: Reviewer's Guide, AdKnowledge, May 1998.
Ad-Star.com website archive from www.Archive.org. Apr. 12, 1997 and Feb. 1, 1997.
Acknowledge System Documentaion, 1996.
Baseview Products, Inc., AdManagerPro Administration Manual v. 2.0, Dec. 1998.
Baseview Products, Inc., ClassManagerPro Administration Manual v. 1.0.5, Feb. 1, 1997.
Business Wire, "Global Network, Inc. Enters Into Agreement in Principle With Major Advertising Agency," Oct. 4, 1999.
Chris Sherman, "Google Launches AdWords Select," Feb. 20, 2002, 6 pages.
Collection of papers from findwhat.com, http://www.findwhat.com/index.asp, printed Jul. 29, 2003.
Collection of papers from Sprinks.com, http://sprinks.com, printed on Jul. 29, 2003.
Collection of papers from Kandoodle.com, http://kanoodle.com/about/about.cool, printed on Jul. 29, 2003.
Collection of papers from Google Advertising, http://google.com/ads/, printed on Jul. 29, 2003.
Detrick, R., Interactive Electronic Advertising, IEEE, 1994.
Detrick, R., A Consumption Model for Targeted Electronic Advertising, Intel Architecture Labs, IEEE, 1995.
Google Introduces New Pricing for Popular Self-Service Online Advertising Program, http://www.google.com/pressrel/select.html, p. 1-2, printed on Jul. 29, 2003.
Information Access Technologies, Inc., Aaddzz brochure, "The Best Way to Buy and Sell Web Advertising Space," © 1997.
Information Access Technologies, Inc., Aaddzz.com website archive from www.Archive.org., Archived on Jan. 30, 1998.
International Search Report dated Feb. 8, 2005.
"The Best Way to Buy and Sell Web Advertising Space," Aaddzz Brochure, 1997.
NetGravity Administrators and Users Guide, version 3.5, 1999.
Search Overview, http://www.content.overture.com/d/Usm/about/news/searchoverview.jhtml, p. 103, printed on Jul. 29, 2003.
Claim Chart, Invalidity of U.S. Pat. No. 7,249,059 by U.S. Pat. No. WO97/21183.
Claim Chart, Invalidity of U.S. Pat. No. 6,829,587 by U.S. Pat. No. WO97/21183.
Claim Chart, Invalidity of U.S. Pat. No. 7,240,025 by U.S. Pat. No. WO97/21183.
Claim Chart, Invalidity of U.S. Pat. No. 6,446,045 by U.S. Pat. No. WO97/21183.
Zeff, R. et al.., Advertising on the Internet, $2^{nd}$ Ed., John Wiley & Sons, 1999.
Request for Reexamination of U.S. Pat. No. 7,240,025 B2, Control No. 95/001,073.
Request for Reexamination of U.S. Pat. No. 6,446,045 B1, Control No. 95/001,061.
Request for Reexamination of U.S. Pat. No. 7,249,059, Control No. 95/001,069.
Request for Reexamination of U.S. Pat. No. 6,829,587 B2, Control No. 95/001,068.
English Translation of Notice of Rejection mailed Nov. 15, 2010 from related Korean Application No. 10-2005-7001391, 5 pages.

* cited by examiner

| FILTER NO | INTERNET ADVERTISING DISTRIBUTION PARTNER | FILTER TYPE | AFFIRMATIVE /NEGATIVE | FILTER CHAR-ACTERISTIC | FILTER CREATOR |
|---|---|---|---|---|---|
| 1 | CNN.COM | URL | - | "AMAZON.COM" | BARNES & NOBLE |
| 2 | ABC.COM | URL | - | "NBC" | ABC |
| 3 | WEBMD | TEXT | + | "HEALTH" | WEBMD |
| 4 | WASHINGTON POST | TITLE | - | "APPLE" | MICROSOFT |
| 5 | WEATHER.COM | SUBJECT MATTER | + | "WEATHER" | THE WEATHER CHANNEL |
| 6 | DISNEY.COM | TEXT | - | "SEX" | DISNEY |
| 7 | CNN.COM | DISPLAY URL | - | "MICROSOFT" | AOL |

FIGURE 2 dogs 10 Our luxurious Pooch Pillow covers are made with your choice of faux animal prints or solid plush fake furs. Feather and down-filled pillow inserts. Trims available. http://www.poochpillows.com $0.39 http://sprinks-clicks.about.com/?ref=shelley_SGD&bid=9165509&lnk=http%3A%2F%2Fwww.poochpillows.com Buy our dog waste cleanup bags and save big - huge savings over retail. Our unique handled bags make cleanup a breeze. Order through our secure website and your order is shipped the same day. http://www.dogpoopbags.com $0.38 http://sprinks-clicks.about.com/?ref=shelley_SGD&bid=9304896&lnk=http%3A%2F%2Fwww.dogpoopbags.com Save up to 50% and more on PetSafe Invisible Fences, Bark Collars, Dog Doors, Remote Trainers and more. Free Shippping and a Lifetime Warranty! http://www.radiofence.com/ $0.37 http://sprinks-clicks.about.com/?ref=shelley_SGD&bid=7385569&lnk=http%3A%2F%2Fwww.radiofence.com%2Fabout.html It's more than simply a dog bed-it's a canine comfort device. The Canine Cooler® pad is ongoing healthy therapy for the animal. It is superb at comforting dogs with bad joints or other conditions. http://www.easysource.com/ $0.30 http://sprinks-clicks.about.com/?ref=shelley_SGD&bid=9527300&lnk=http%3A%2F%2Fwww.easysource.com%2Fcc_index.htm%3Fsprinks_dogsCG Smart Dog, Free Spirit, Command Series II, Retriever, Beeper collars, Gun Dog & Radio Tracking systems - the full Innotek line. Free Shipping Canada & USA - member BBB. http://www.sportdog.ca $0.29 http://sprinks-clicks.about.com/?ref=shelley_SGD&bid=8346296&lnk=http%3A%2F%2Fwww.sportdog.ca Offering the largest selection of invisible fences, bark collars, training collars, dog doors and pet feeders from Innotek, RadioPet and DT Systems. Lifetime Warranty and Free Shipping. http://www.radiopet.com $0.28 http://sprinks-clicks.about.com/?ref=shelley_SGD&bid=7054750&lnk=http%3A%2F%2Fwww.radiopet.com Effectively treat arthritis and hip dysplasia in dogs and cats with liquid glucosamine formula Syn-flex. Includes pharmaceutical grade glucosamine and 12 other ingredients. Free shipping! http://www.activexamerica.com/ $0.26 http://sprinks-clicks.about.com/?ref=shelley_SGD&bid=7270388&lnk=http%3A%2F%2Fwww.activexamerica.com%2Fat.cgi%2F179685%2F Dog bed in 1st Bush White House. Internet's widest variety, color choice! Car booster seat: dogs see out car window. Waterproof & Super Ortho dog beds, more! Beastly pet furniture. http://www.snoozer-dog-beds.com/ $0.25 http://sprinks-clicks.about.com/?ref=shelley_SGD&bid=8235068&lnk=http%3A%2F%2Fwww.snoozer-dog-beds.com%2F The pet prescriptions and medicines your looking for at discount prices. http://www.onestopeshops.com/ $0.20 http://sprinks-clicks.about.com/?ref=shelley_SGD&bid=6106211&lnk=http%3A%2F%2Fwww.onestopeshops.com%2Fpet_prescriptions.htm Get all your pet supplies delivered free! Check us out today, we have supplies for dogs, cats, rabbits, chinchillas and more. We're not just for ferrets. http://www.ferretstore.com $0.20 http://sprinks-clicks.about.com/?ref=shelley_SGD&bid=7663466&lnk=http%3A%2F%2Fwww.ferretstore.com

Fig. 5

METHOD AND SYSTEM FOR PROVIDING FILTERED AND/OR MASKED ADVERTISEMENTS OVER THE INTERNET

CROSS-REFERENCE TO RELATED APPLICATIONS

This application claims priority to U.S. application Ser. No. 10/388,166, filed on Mar. 14, 2003 entitled "Method and System for Providing Filtered and/or Masked Advertisements Over the Internet," and U.S. Provisional Application Ser. No. 60/398,101, filed on Jul. 25, 2002 entitled "Method and System for Providing Filtered and/or Masked Advertisements Over the Internet," the entirety of which is hereby incorporated by reference.

FIELD OF THE INVENTION

This invention relates to systems for and methods of filtering and masking advertising over a system of distribution partners over the Internet.

BACKGROUND OF THE INVENTION

Many content-based Internet sites enter exclusive advertising arrangements with a specific advertiser, so that the Internet site is precluded from also distributing or displaying advertisements for competitors of that specific advertiser. The specific advertiser usually pays a premium to the Internet site for such exclusivity rights. The content-based Internet site generally enters these relationships with long-term advertisers who are valuable customers of the Internet site. However, an Internet site generally generates revenue from advertising and usually would like to generate as much revenue as possible from placing other non-exclusive advertisements on its Internet site.

Over the Internet, one way for a website to generate advertising revenue without having to develop its own advertising infrastructure is to receive advertisement listings from a listings provider, such as one that maintains the infrastructure to place and rank advertisement listings. Such arrangements present problems for the content-based Internet site because the ads received from the listing provider could violate its exclusivity arrangement(s).

This problem may preclude the listings provider from being able to sell its services to some Internet sites and similarly may preclude an Internet site from being able to utilize the listings server to generate revenue for its site. These and other drawbacks exist with current systems and methods.

SUMMARY OF THE INVENTION

Various embodiments of the present invention relate to methods and systems that allow an Internet distribution partner of an advertisement listings provider to receive filtered and/or masked listings for display on the website of the Internet distribution partner. This system and method allows the Internet distribution partner to define characteristics of advertisement listings to be received by the Internet distribution partner in one or more filters. The characteristics may specify the features of the advertisement it desires, the features of advertisements to be excluded or various combinations thereof. Once the characteristics of advertisement listings are defined, the advertisement listings provider system applies those characteristic(s) to the listings in its database and identifies matches and/or excludes matches depending on the characteristic(s) specified. The advertisement listings provider may then send the Internet distribution partner advertisement listings based on the application of one or more filter(s) selected by the distribution partner. Thus, the advertisement listings provider and the Internet distribution partner are able to generate additional revenue without risking the Internet distribution partner's valuable relationships with its exclusive advertisers and without jeopardizing the Internet advertising distribution partner's relationships with its end users.

Also, each distribution partner may specify several filters and may, on its own, alter the filter to be applied by the advertising listings partner based on time of day, experimenting to determine effectiveness of different filters, the source page where the listings are to be provided and any other factor it chooses. Moreover, in current systems, distribution partners request the listings through HTTP "GET" command. Through one embodiment of the present invention, a filter identification code (e.g., an alphanumeric code) is supplied with the parameters of the GET command, resulting in a minimal addition to the size of its request and requiring little reprogramming of the distribution partner's website to request that the filter be applied.

Many advantages of such a system are achieved. Particularly, for an advertising listing provider that is open to all advertisers and whose advertisers may be constantly changing, it would be virtually impossible to have a human monitor outgoing advertisements to distribution partners to ensure that any exclusivity arrangements are not going to be violated. The system of the present invention allows the advertising listings provider to preclude such violations without regard to changes to the advertisements in its database.

Aside from violating exclusivity arrangements, many other reasons exist for why a distribution partner's website may wish to exclude certain advertisements or only include certain advertisements from a rapidly changing database of advertisement listings. Operators of one website may believe that its readers are predisposed to be offended by certain advertisements and may therefore create a filter to exclude offensive advertisement by "keyword" exclusion. Operators of another website may believe that only advertisements related to a specific topic may be of interest and may thus create a filter accordingly. Various combinations may be selected, such as excluding all advertisements containing keyword A and requiring that all advertisements include keyword B.

The filters created may be keyword-based, URL based, topic-based or any other metric known about an advertisement in the source database from which advertisements are generated from the advertisement listings provider system.

In addition to filters, the advertisement listings provider may define a plurality of masks that mask out advertisements in predetermined categories. An Internet advertising distribution partner may thus specify masks, filters, or combinations thereof to ensure that it receives the advertising content that best suits its purposes. According to one embodiment, a mask may be subject matter based and each advertisement listing recorded in the advertising database provided by the advertisement listings provider may be specified as to whether it falls within one of those predetermined categories. For example, five different masks may be defined—a vice ad mask, an adult/sexual ad mask, a gambling ad mask, a non-FDA drug ad mask and a psychic ad mask. By specifying one or more of those mask values, the advertising distribution partner may indicate that they do not wish to receive any advertisements that relate to any type of a vice (e.g., smoking, drinking, gambling, sex, etc.), adult or sexual advertisements, gambling, non-FDA drugs, or ads relating to psychics, respectively.

Other advantages of the various embodiments of the present invention will be appreciated from a review of the detailed description that follows.

BRIEF DESCRIPTION OF THE DRAWINGS

FIG. 2 is an example of a database containing multiple advertisement filters defined by Internet advertising distribution partners according to an embodiment of the present invention.

FIG. 5 is an example of listings provided to an advertising distribution partner in response to a request from an advertising listings provider according to an embodiment of the present invention.

DETAILED DESCRIPTION OF THE EMBODIMENTS

Various embodiments of a filter-based advertisement distribution system are described below. An overview of the system 10 is depicted in FIG. 1.

Figure 1:
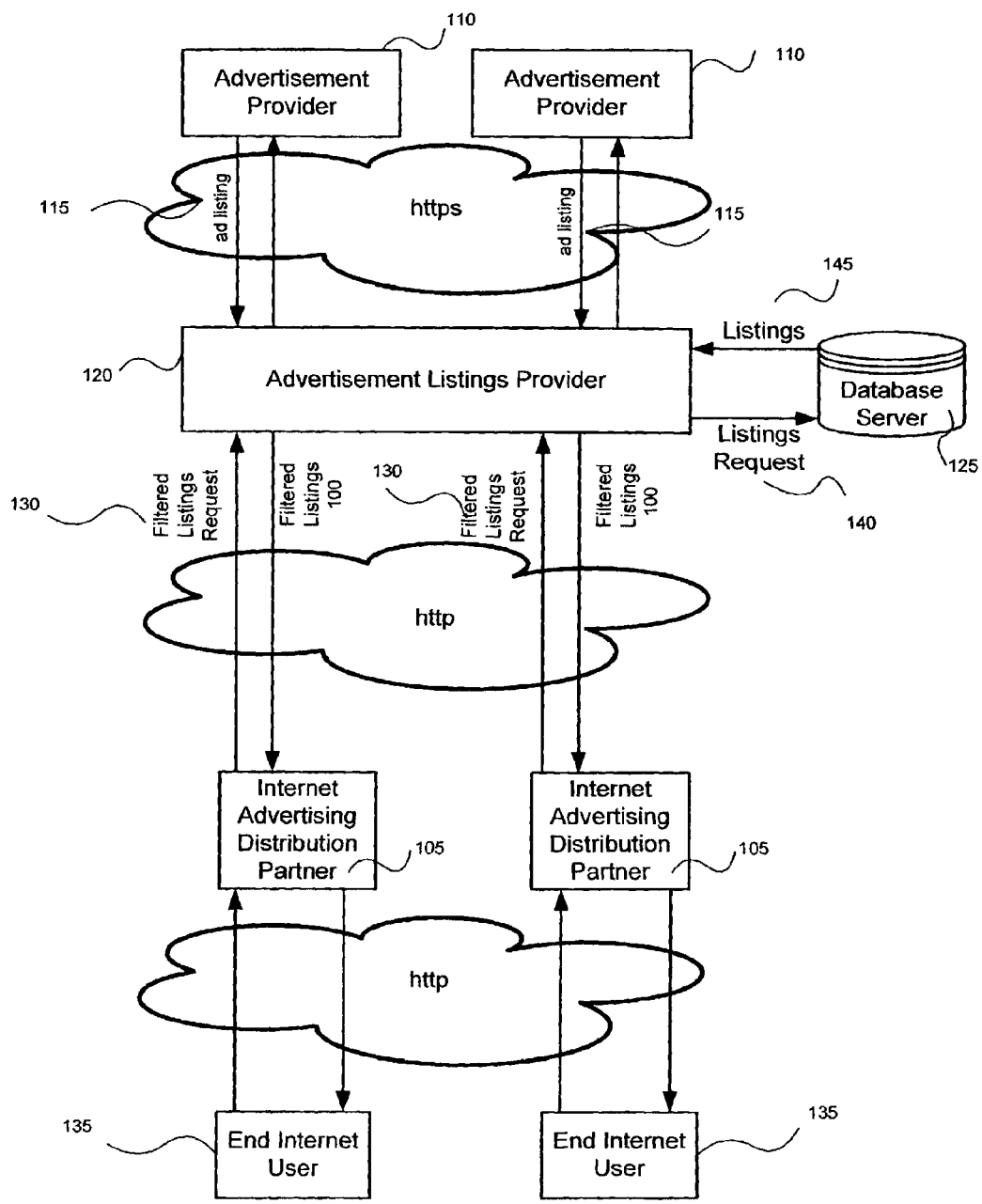
FIG. 1 is a schematic diagram of a system of providing filtered advertisement listings to at least one Internet advertising distribution partner in an embodiment of the present invention.

FIG. 1 is a schematic diagram of a system that enables filtered advertisement listings 100 to be provided to at least one Internet advertising distribution partner 105 in an embodiment of the present invention. In the present embodiment, at least one advertisement provider 110 submits its advertisement listings to the advertisement listings provider 120. In the present embodiment two (2) advertisement providers 110 are shown, although it is understood that any number of advertisement providers 110 may submit advertisement listings 115 to an advertisement listings provider 120. Moreover, an individual advertisement provider 110 may submit more than one advertisement listing 115 to advertisement listings provider 120. An advertisement listing 115 may include all or part of the following information fields, some of which are supplied by the advertising provider and some of which are stored by the advertising provider (e.g., the advertisement ID number): the name of the advertisement provider, a title of the advertisement, a description of the goods or services advertised, a URL to be displayed in the listing, where an end user will be directed upon clicking on the advertisement, contact information, an email address, billing information, pricing information, and an advertisement identification number.

In an embodiment of the present invention, the advertising listing provider 120 may rank the advertisement listings submitted (e.g., by keyword, subject or otherwise) and store the ranked listings in a database server 125. The rank that an advertisement listing 115 is assigned may depend upon the bid the advertisement provider 100 offers the advertisement listings provider 120 for a "click-through." For example, the price may be a flat rate for placement or a price per end Internet user 135 who selects the advertisement, often referred to as price-per-click through. Also, the ranking may be based on a revenue model as disclosed in co-pending application No. 60/406,064, filed Aug. 27, 2002, entitled "Method and System for Providing Advertising Listing Variance in Distribution Feeds over the Internet," the entirety of which is hereby incorporated by reference. The advertisement listing 115 may contain a hyperlink so that when an end Internet user 135 may select the advertisement, and be redirected to a predetermined website defined in the advertisement listing 115.

An Internet advertising distribution partner 105 may maintain a website. An end Internet user 135 may access that website via an http connection. The Internet advertising distribution partner 105 may have an agreement with an entity to place its predetermined advertisement listings on its website and not to place advertisement listings of other predetermined competitors. For example, an Internet advertising distribution partner 105 such as CNN (www.cnn.com) may have an agreement with Barnes and Noble to place a Barnes and Noble advertisement listing on its website. That agreement may also require that CNN not place any advertisements for Amazon.com on its website. Thus, CNN may wish to receive supplemental advertisement listings 110 to increase its revenue without receiving any advertisements for Amazon.com.

According to an embodiment of the present invention, CNN, an Internet advertising distribution partner 105, may send the advertisement listings provider 120 a filtered listings request 130. The filtered listings request 130 may direct that certain predefined filters stored in the database server 125 be applied such as by using a filter identifier. Also, it should be understood that the filters may be stored in another location, or the filters may not be stored at all, but defined each time a filter listings request 130 is generated. In the latter example, the filter may identify the characteristics the Internet advertising distribution partner 105 wishes to include or exclude from the advertisement listings 115 received.

Upon receiving a filtered listings request 130, the advertisement listings provider 120 may send a listings request 140 to the database server 125. In one embodiment of the present invention, the filtered listings request may be a single http GET command that requests listings and requests a filter to be applied. The database server 125 may return available listings 145. These listings 145 may or may not be ranked. The advertisement listings provider 120 may then apply the requested filter and send filtered listings 100 to the Internet advertising distribution partner 105. The Internet advertising distribution partner 105 may then dynamically include information from the filtered listings 100 in its website content delivered to end Internet user(s) 135.

A distribution advertising partner 105 may generally transmit a filtered listing request 130 for each request of a webpage to contain the filtered listings 100 due to the dynamically changing content of listings, rankings, etc. It should be appreciated that advertising distribution partner 105 may cache the filtered listings to reduce the number of requests to advertisement listings provider 120. The cache may be used for minutes, hours, etc., as desired.

Internet advertising distribution partner 105 may comprise a website and any structure, software and network connections to implement that functionality. End Internet users 135 may connect using an Internet-compatible device. Similarly, advertisement providers 110 may connect to advertisement listings provider 120 using any Internet-compatible device. Database server 125 may comprise any data storage system accessible and usable with an Internet-based server system such as advertisement listings provider 120. Variations to the systems shown in FIG. 1 may be made as known those or ordinary skill in the art, such as by enabling some of the network connections to be made over a network other than the Internet or making connections secure or non-secure as deemed appropriate. As described above, the advertisement and filters may be stored in database server 125.

End Internet user 135 may view the filtered listings 100 on the website of the Internet advertising distribution partner 105. In this particular embodiment, there are two (2) Internet advertising distribution partners 105 shown. However, it should be understood that any number of Internet advertising distribution partners 105 may be incorporated into the present invention. Additionally, there are two (2) end Internet users 135 shown in this embodiment. However, it should be understood that any number of end Internet users 135 may receive filtered listing from each Internet advertising distribution partner 105.

FIG. 2 is an example of multiple advertisement filters defined by Internet advertising distribution partners and stored in a database. An Internet advertising distribution partner 105 may desire to increase revenue by adding advertisement listings onto their website. The Internet advertising distribution partner 105 may receive monetary compensation for each click-through from their website to the advertiser's website in a preferred embodiment. However, the Internet advertising distribution partner may have an exclusive arrangement with a seller of books, Barnes and Noble for example, which precludes that Internet advertising distribution partner 105 from advertising for any other sellers of books on the website. Thus, in one embodiment of the present invention the Internet distribution partner 105 may wish to receive only listings which do not include "Amazon.com" in the URL.

One example filter database, as shown in FIG. 2, may include one or more of the following fields: filter number 200, Internet advertising distribution partner 205, filter type 210, affirmative/negative 215, filter characteristic 220, filter creator 225. The filter number 200 may be used as a storage and identity mechanism. Each filter may have a unique filter number 200. The Internet advertising distribution partner 205 may represent the website or advertiser where the filtered listings may be delivered. The filter type 210 may identify what section of the advertisement listing to which the filter is to be applied to. Example filter applications include the text of the advertisement, the URL displayed, the URL to which the advertisement listing will direct the Internet end user, the title of the advertisement, or a content node of specific subject matter. The affirmative/negative 215 field may store whether the filter is to include or exclude the filter characteristic 220, respectively. The filter characteristic 220 field may be used to store the particular text to be excluded. Moreover, the filter creator field 225 may identify the source of the filter. The filter creator 225 may or may not be the same entity as the Internet advertising distribution partner 205. Other fields may be included in this database to store information relevant to placing an advertisement listing.

For example, filter number 1 may be applied to filter the advertisement listings provided to cnn.com. In this example, CNN may have a contract with Barnes and Noble which disallows it from placing advertisements for Amazon.com. Thus, filter 1 has a filter type 210 of URL and a affirmative/negative setting 215 of negative. This indicates that advertisement listings with a filter characteristic 220 of "Amazon.com" in the URL may be excluded from the filtered advertisement listings delivered to cnn.com. Filter number 1 has a filter creator 225 of Barnes and Noble. This indicates that Barnes and Noble is the source of the exclusion. Sometimes, the Internet advertising distribution partner itself may be the source of the filter. For example, filter number 2 may be applied to requests for advertisements from abc.com and may exclude advertisements with NBC in the URL, since NBC is a competitor of the Internet advertising distribution partner itself.

There may be other motivations for filtering the listings on an Internet site. For example, an Internet advertising distribution partner, such as www.disney.com may wish to be family friendly and may therefore wish to filter any listings with the word "sex" in any of the listing's text. Thus, as shown in filter number 6, the Internet advertising distribution partner disney.com may submit a request for filtered listings to the advertisement listings provider with a negative filter type 210 of text, a filter characteristic of "sex" and filter creator 225 of the Internet advertising distribution partner, itself. In addition to filters, it may be desirable to also provide masks that generally exclude advertisements in certain predefined categories defined by the advertisement listing provider and/or advertising distribution partners. In such an embodiment, a series of masks may be identified by mask number. So, for example, a mask may be provided to exclude vice ads, adult/sexual ads, gambling ads, non-FDA drug ads, and psychic ads. In such an embodiment, the vice ad mask may be designated with a value of 1, the adult/sexual ad mask may be designated with a value of 2, gambling ad mask may be designated with a value of 3, the non-FDA drug ad mask may be designated with a value of 4, and the psychic ad mask may be designated with a value of 5. Also, it may be desirable to provide a certain number of bits to be able to enable the selection of an ad mask based on whether the bit value is 0 or 1. Accordingly, if there are five different masks, then a five bit code may be provided with each bit designating whether or not a particular mask is to be applied. So, in this embodiment, the vice ad may be assigned bit 1, the sexual ad may be assigned bit 2, the gambling ad assigned bit 3, the non-FDA drug ad mask assigned bit 4, and the psychic ad mask assigned bit 5. So, for example, if an advertiser wished to mask out vice ads and psychic ads, it would provide a bit mask value of 10001.

An example of an affirmative filter is shown in FIG. 2 as filter number 3. In this example, the Internet advertising distribution partner 205, WebMD, may request advertisement listings which contain the word "health" in the text of the advertisement listing. This filter may be desirable so that the readers of the Internet advertising distribution partner 205 receive information relevant to their interests.

It should be understood that an Internet advertising distribution partner may store as many unique filters in the database as is desired. Moreover, an Internet advertising distribution partner may indicate which filters are to be applied in each filtered advertising request. Furthermore, the actual advertisement listings received by the Internet advertising distribution partner are determined by the particular filtered listing request submitted. Thus, a particular advertisement listing which is excluded by the application of a filter to one Internet advertising distribution partner may be delivered to other Internet advertising distribution partners.

It should also be appreciated that the advertisements in the database server 125 may be categorized based on keyword or subject with which the advertisement is associated. For example, advertisers may bid on keywords or subjects and therefore, the advertisement listings provider ranks advertisements based on bids for a given keyword or subject. Advertisements distribution partners then may request advertisements using the keyword or subjects by which the advertisements are categorized. The filter may then be applied to the ranked listing. In the CNN example above, CNN may request advertisement listings for its main "Sports" page from the advertisement listings stored in the advertisement listings provider associated with a keyword "sports." CNN may then specify a filter to exclude advertisements made by ESPN by excluding all ranked listings which contain, in its text, the keyword "ESPN."

Similarly, in the Sprinks System operated by the assignee of the present invention, advertisement providers may bid on subjects based on an hierarchical node-based system. A distribution partner may request ranked listings from a subject in such a system but request exclusion of any advertisement from a URL of a competitor. Other combinations of category-request and filter are all possible within the scope of the present invention.

Figure 3:
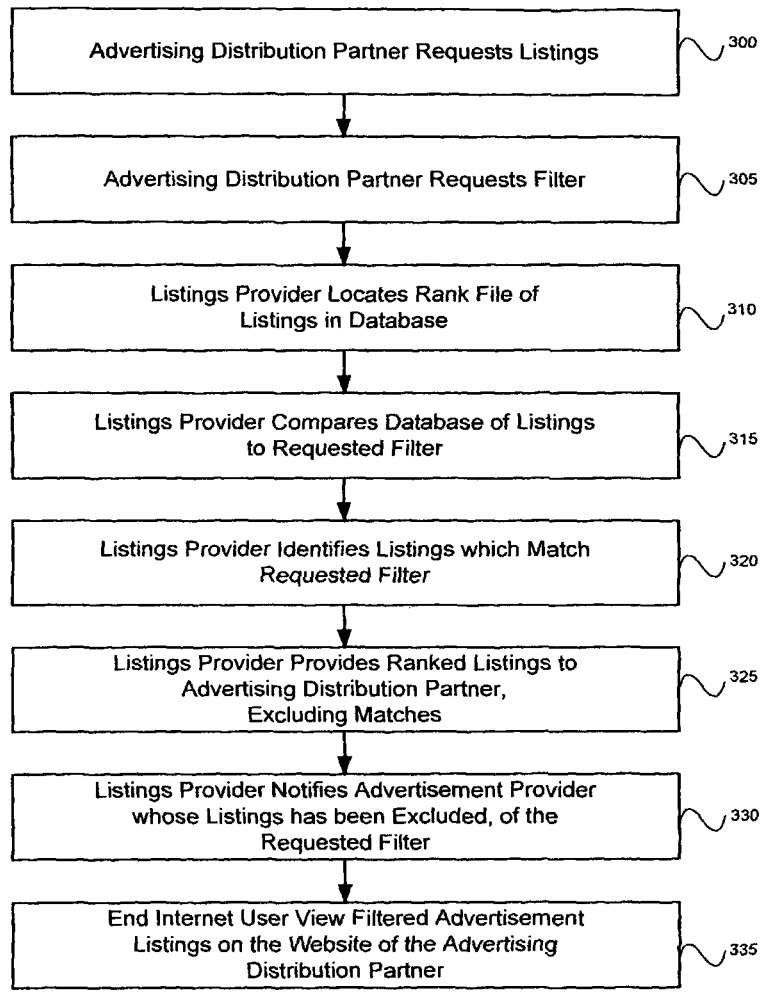
FIG. 3 is a flowchart showing a process for an Internet distribution partner to receive filtered advertisement listings from an advertisement listings provider according to an embodiment of the present invention.

While various methods may be employed within the scope of the present invention, one such method is depicted in FIG. 3 for a filter that excludes results. FIG. 3 is a flowchart showing a process for an Internet distribution partner to receive filtered advertisement listings from an advertisement listings provider according to one embodiment of the present invention. In step 300 of the process, an Internet advertising distribution partner may request listings from an advertisement listings provider. In step 305 of the process, the Internet advertising distribution partner may request one or more filters on the listings to be provided. In one embodiment of the present invention, the advertisement listings provider may then generate a ranked file of listings in its database in step 310. In step 315 the advertisement listings provider may then compare the chosen filter fields to the fields in the database and identify matches in step 320. The advertisement listings provider may delete the listings identified as matches from the rank file, but not from the database, and provide a filtered ranked file of listings to the advertising distribution partner in step 325. The listings provider may notify the advertisement provider whose listing has been excluded, by the requested filter in step 330. This step in the process is optional, because performing this step may discourage advertisement providers from paying greater amounts to increase their rankings. However, performing this step may inform the advertisement provider why their advertisement would not show up on certain web sites where the advertisement provider would expect to see their listing, instead of having the advertisement provider discover the omission on their own. In step 335, an end Internet user may view the filtered listings while accessing the Internet web site of the Internet advertising distribution partner.

Figure 4A:
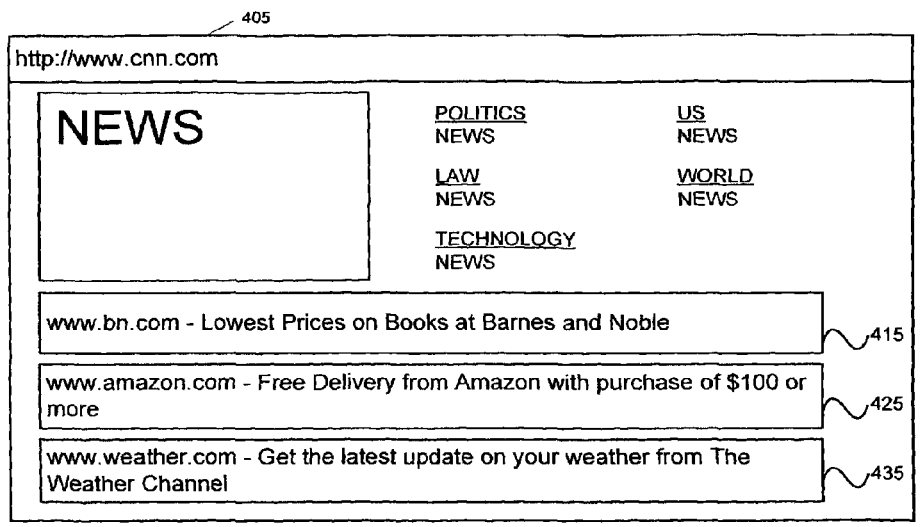
FIG. 4A is an example of outputted advertisement listings that may be delivered to an Internet advertising distribution partner without any filters applied.
Figure 4B:
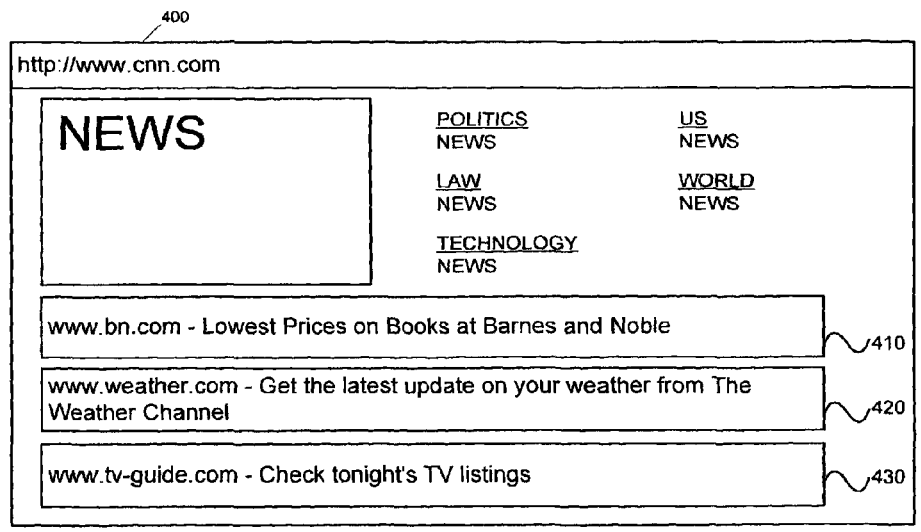
FIG. 4B is an example of outputted advertisement listings that may be delivered to the same Internet advertising distribution partner with filter 1 applied.

To better understand how the listings may be displayed by distribution partners, one example is depicted in FIGS. 4A and 4B. FIG. 4A displays a graphical user interface (GUI) with advertisement listings that may be delivered to an Internet advertising distribution partner without any filters applied. In this GUI, the Internet advertising distribution partner 405, www.cnn.com, shows three advertisement listings 415, 425 and 435. In this example, the advertisement listings may be ranked in that order as a result of the price offered for listing the advertisements. For example, Barnes and Noble may be listed first as a result of an agreement from www.cnn.com not to place advertisements for Amazon.com. www.cnn.com desires to fill openings on its website for advertisement listings and thus may request advertisement listings from an advertisement listings provider to supplement its own advertising revenue. With the advertisement listings provider, Amazon.com may have offered 9 cents per click through for placement and The Weather Channel may have offered 3 cents per click through for placement. In the example shown in FIG. 4A no filters have been applied, thus all three advertisements appear in the following order: Barnes and Noble, Amazon.com, and The Weather Channel. If FIG. 4A were generated for end Internet users, www.cnn.com appears to have violated its contractual obligations to Barnes and Noble.

FIG. 4B is a GUI with advertisement listings that may be delivered to the same Internet advertising distribution partner with filter 1 from FIG. 2 applied. This filter would exclude any advertisement listings with "Amazon.com" in the URL. Thus, FIG. 4A shows that the advertisement for Barnes and Noble remains the first listed advertisement at 410. The Amazon.com advertisement does not appear and in the second position, the Weather Channel advertisement listing has moved up to 420. The third position is now occupied by and advertisement for TV Guide at 430. Thus, with filter 1 applied, www.cnn.com is able to increase its potential for generating advertising revenue by supplementing its advertisement listings without breaching its contract with Barnes and Noble.

As discussed above, in one embodiment, the filter to be applied may be stored in association with the advertising listings provider 120 and identified by an identifier supplied by an Internet advertising distribution partner 105. FIG. 5 is an example of the listings provided to an advertising distribution partner in response to an http GET command according to one embodiment of the present invention. In this example, the get request may be "http://get.about.com/xml_sprinks.txt?ref=shelley&type=g&term=dogs." The "get.about.com" portion of the request identifies the advertisement listings provider's URL and directs where to send the request. In this example, "ref=shelley" identifies the Internet advertising distribution partner, so that the advertisement listings provider knows who is making the request and where to return the results. The "type=g" and "term=dogs" identify the category of listings desired within the database server. The GET command is instructing the advertisement listings provider to return listings based on bids for the "dogs." In this case, the returned results may be limited to a listings associated with the "dogs" (term=dogs) content site (type=g) in the listing. If the Internet advertisement distribution partner wished to send a filtered listings request, the command may be http://get.about.com/xml_sprinks.txt?ref=shelley&type=g&term=dogs&f=0001." "f=0001" indicates that the Internet advertisement distribution partner wishes to filter the rank file with the predefined filter number 1, which may be stored in the advertisement listings provider database. The advertisement listings provider may access Internet advertising distribution partner shelley's filter number 1 from its database and apply the filter to the rank file. Any listings which are matches with the filter may be deleted from the rank file and the rank file may then be distributed to shelley via an http connection. If filter number 1 were predefined, for example to exclude any listings with a URL of "poochpillows.com," then the rank file that would be delivered to shelley would exclude the first listing shown in FIG. 5. The listing which is listing number 2 in FIG. 5 would become listing number 1 in the rank file. If the advertising distributor partner also wished to specify a mask, the get request may be as follows: http://get.about.com/xml_sprinks.txt?ref=shelley&type=g&term=dogs&f=0001&m=10001. This would specify that filter 1 was being applied as well as mask value 10001 as mentioned about which could mask out the vice ads and psychic ads from the content.

It should also be appreciated that multiple filters may be selected by an Internet advertising distribution partner and may be provided by specifying multiple filter values separated by the ampersand in the get http request.

While the foregoing description includes details and specificities, it should be understood that such details and specificities have been included for the purposes of explanation only, and are not to be interpreted as limitations of the present invention. Many modifications to the embodiments described above can be made without departing from the spirit and scope of the invention, as it is intended to be encompassed by the following claims and their legal equivalents.

What is claimed is:

1. A computer-implemented method comprising:
   receiving at a server a request for one or more advertisements and a filter identifier of a filter, wherein the filter includes one or more publisher criteria, specified by a publisher for matching advertisements to be provided on a publisher page, including a filter type that identifies a particular section of an advertisement to apply the filter, and an affirmative indication or a negative indication;
   identifying a set of advertisements responsive to the request;
   modifying the identified set of advertisements including:
      removing from the set of advertisements any advertisements having a section specified by the filter type that satisfies one or more publisher criteria of the filter when the filter includes a negative indication, and
      removing from the set of advertisements any advertisements having a section specified by the filter type that does not satisfy the one or more publisher criteria of the filter when the filter includes an affirmative indication; and
   providing one or more of the modified set of advertisements for publication on the publisher page in response to the request.

2. The method of claim 1, further comprising:
   notifying a source of the advertisement listing when the advertisement listing has been excluded from the set of advertisement listings.

3. The method of claim 1, wherein the section identified by the filter type is a display URL of the advertisement.

4. The method of claim 1, wherein the section identified by the filter type comprises less than an entire advertisement.

5. The method of claim 1, wherein the section identified by the filter type is a URL associated with the advertisement.

6. The method of claim 3, wherein the section identified by the filter type is a title of the advertisement.

7. The method of claim 1, wherein the request for one or more advertisements is a single network command.

8. The method of claim 1, further comprising receiving the filter from the publisher.

9. A computer-implemented method comprising:
   receiving a request for an advertisement and an identifier of a filter, wherein the filter defines publisher preferences of a publisher and includes:
      a filter characteristic specifying one or more words or phrases to be filtered,
      a filter type identifying a section of an advertisement to apply the filter characteristic, and
      an indication associated with the filter characteristic that indicates whether the filter characteristic must be included or excluded from any advertisements for the advertisements to be eligible for delivery;
   identifying a set of advertisements that are responsive to the request;
   generating, by one or more servers, a modified set of advertisements based at least in part on the filter type, the filter characteristic, and the indication; and
   delivering at least one of the modified set of advertisements responsive to the received request.

10. The method of claim 9, further comprising:
    notifying a source of the advertisement listing when the advertisement listing has been excluded from the set of advertisement listings.

11. The method of claim 9, wherein the section identified by the filter type comprises less than an entire advertisement listing.

12. The method of claim 9, wherein the section identified by the filter type is a URL associated with the advertisement.

13. The method of claim 9, wherein the section identified by the filter type is a title of the advertisement.

14. The method of claim 9, wherein the request for an advertisement is a single network command.

15. A system comprising:
    one or more computers and one or more storage devices storing instructions that are operable, when executed by the one or more computers, to cause the one or more computers to perform operations comprising:
       receiving at a server a request for one or more advertisements and a filter identifier of a filter, wherein the filter includes one or more publisher criteria, specified by a publisher for matching advertisements to be provided on a publisher page, a filter type specifying a portion of an advertisement, and an affirmative indication or a negative indication;
       identifying a set of advertisements responsive to the request;
       modifying the identified set of advertisements including:
          removing from the set of advertisements any advertisements that satisfy one or more criteria of the filter in a respective portion when the filter includes a negative indication, and
          removing from the set of advertisements any advertisements that do not satisfy the one or more criteria of the filter in a respective portion when the filter includes an affirmative indication; and
       providing the modified set of advertisements for publication on the publisher page in response to the request.

16. The system of claim 15, wherein the operations further comprise:
    notifying a source of the advertisement listing when the advertisement listing has been excluded from the set of advertisement listings.

17. The system of claim 15, wherein the portion specified by the filter type is a display URL of the advertisement.

18. The system of claim 15, wherein the portion specified by the filter type comprises less than an entire advertisement.

19. The system of claim 15, wherein the portion specified by the filter type is a URL associated with the advertisement.

20. The system of claim 17, wherein the portion specified by the filter type is a title of the advertisement.

21. The system of claim 15, wherein the request for one or more advertisements is a single network command.

22. The system of claim 15, wherein the operations further comprise receiving the filter from the publisher.

23. A system comprising:
    one or more computers and one or more storage devices storing instructions that are operable, when executed by the one or more computers, to cause the one or more computers to perform operations comprising:
       receiving a request for an advertisement and an identifier of a filter, wherein the filter defines publisher preferences of a publisher and includes:
          a filter characteristic specifying one or more words or phrases to be filtered, a filter type identifying a section of an advertisement to apply the filter characteristic, and an indication associated with the filter characteristic that indicates whether the filter characteristic must be included or excluded from any advertisements for the advertisements to be eligible for delivery;

identifying a set of advertisements that are responsive to the request;

generating a modified set of advertisements based at least in part on the filter type, the filter characteristic, and the indication; and delivering at least one of the modified set of advertisements responsive to the received request.

24. The system of claim 23, wherein the operations further comprise:

notifying a source of the advertisement listing when the advertisement listing has been excluded from the set of advertisement listings.

25. The system of claim 23, wherein the section identified by the filter type comprises less than an entire advertisement listing.

26. The system of claim 23, wherein the section identified by the filter type is a URL associated with the advertisement.

27. The system of claim 23, wherein the section identified by the filter type is a title of the advertisement.

28. The system of claim 23, wherein the request for an advertisement is a single network command.

29. A computer program product, encoded on one or more non-transitory computer storage media, comprising instructions that when executed by one or more computers cause the one or more computers to perform operations comprising:

receiving at a server a request for one or more advertisements and a filter identifier of a filter, wherein the filter includes one or more publisher criteria, specified by a publisher for matching advertisements to be provided on a publisher page, including a filter type that identifies a particular section of an advertisement to apply the filter, and an affirmative indication or a negative indication;

identifying a set of advertisements responsive to the request;

modifying the identified set of advertisements including:

removing from the set of advertisements any advertisements having a section specified by the filter type that satisfies one or more publisher criteria of the filter when the filter includes a negative indication, and removing from the set of advertisements any advertisements having a section specified by the filter type that does not satisfy the one or more publisher criteria of the filter when the filter includes an affirmative indication; and providing one or more of the modified set of advertisements for publication on the publisher page in response to the request.

30. The computer program product of claim 29, wherein the operations further comprise:

notifying a source of the advertisement listing when the advertisement listing has been excluded from the set of advertisement listings.

31. The computer program product of claim 29, wherein the section identified by the filter type is a display URL of the advertisement.

32. The computer program product of claim 29, wherein the section identified by the filter type comprises less than an entire advertisement.

33. The computer program product of claim 29, wherein the section identified by the filter type is a URL associated with the advertisement.

34. The computer program product of claim 31, wherein the section identified by the filter type is a title of the advertisement.

35. The computer program product of claim 29, wherein the request for one or more advertisements is a single network command.

36. The computer program product of claim 29, wherein the operations further comprise receiving the filter from the publisher.

37. A computer program product, encoded on one or more non-transitory computer storage media, comprising instructions that when executed by one or more computers cause the one or more computers to perform operations comprising:

receiving a request for an advertisement and an identifier of a filter, wherein the filter defines publisher preferences of a publisher and includes:

a filter characteristic specifying one or more words or phrases to be filtered, a filter type identifying a section of an advertisement to apply the filter characteristic, and an indication associated with the filter characteristic that indicates whether the filter characteristic must be included or excluded from any advertisements for the advertisements to be eligible for delivery;

identifying a set of advertisements that are responsive to the request;

generating a modified set of advertisements based at least in part on the filter type, the filter characteristic, and the indication; and delivering at least one of the modified set of advertisements responsive to the received request.

38. The computer program product of claim 37, wherein the operations further comprise:

notifying a source of the advertisement listing when the advertisement listing has been excluded from the set of advertisement listings.

39. The computer program product of claim 37, wherein the section identified by the filter comprises less than an entire advertisement listing.

40. The computer program product of claim 37, wherein the section identified by the filter type is a URL associated with the advertisement.

41. The computer program product of claim 37, wherein the section identified by the filter type is a title of the advertisement.

42. The computer program product of claim 37, wherein the request for an advertisement is a single network command.

* * * * *